(12) United States Patent
Saint Georges

(10) Patent No.: US 9,264,137 B2
(45) Date of Patent: Feb. 16, 2016

(54) RAPID IN-THE-FIELD AUTO-ALIGNMENT FOR RADIO FREQUENCY AND FREE-SPACE OPTICAL DATA COMMUNICATION TRANSCEIVERS

(71) Applicant: Aoptix Technologies, Inc., Campbell, CA (US)

(72) Inventor: Eric Saint Georges, Los Gatos, CA (US)

(73) Assignee: AOptix Technologies, Inc., Campbell, CA (US)

( * ) Notice: Subject to any disclaimer, the term of this patent is extended or adjusted under 35 U.S.C. 154(b) by 314 days.

(21) Appl. No.: 13/786,071

(22) Filed: Mar. 5, 2013

(65) Prior Publication Data

US 2014/0248049 A1 Sep. 4, 2014

Related U.S. Application Data

(60) Provisional application No. 61/771,835, filed on Mar. 2, 2013.

(51) Int. Cl.
| H04B 10/08 | (2006.01) |
| H04B 17/00 | (2015.01) |
| H04B 10/00 | (2013.01) |
| H04B 10/112 | (2013.01) |

(52) U.S. Cl.
CPC .................................. *H04B 10/1125* (2013.01)

(58) Field of Classification Search
USPC ........................ 398/115, 116, 118, 128–131
See application file for complete search history.

(56) References Cited

U.S. PATENT DOCUMENTS

| 5,592,320 | A * | 1/1997 | Wissinger | H04B 10/118 398/121 |
| 6,323,980 | B1 * | 11/2001 | Bloom | H04B 10/1125 398/116 |
| 6,347,001 | B1 * | 2/2002 | Arnold | H04B 10/118 398/122 |
| 6,577,421 | B1 * | 6/2003 | Cheng | H04B 10/1125 398/129 |
| 6,590,685 | B1 * | 7/2003 | Mendenhall | G01S 3/786 250/491.1 |
| 6,690,888 | B1 * | 2/2004 | Keller | H04B 10/112 398/129 |
| 8,897,770 | B1 * | 11/2014 | Frolov | H04B 7/18504 244/25 |
| 2002/0164945 | A1 * | 11/2002 | Olsen | G01V 8/005 455/3.01 |
| 2003/0043435 | A1 * | 3/2003 | Oettinger | H04B 10/1123 398/129 |
| 2003/0144041 | A1 * | 7/2003 | Oettinger | H04B 10/1123 398/131 |
| 2004/0037566 | A1 * | 2/2004 | Willebrand | H04B 10/114 398/115 |
| 2004/0141753 | A1 * | 7/2004 | Andreu-von Euw | H04B 10/1127 398/122 |
| 2005/0180753 | A1 * | 8/2005 | Wirth | G02B 26/06 398/118 |

(Continued)

OTHER PUBLICATIONS

PCT International Search Report and Written Opinion, PCT Application No. PCT/US2014/019512, Jul. 8, 2014, eight pages.

*Primary Examiner* — David Payne
*Assistant Examiner* — Pranesh Barua
(74) *Attorney, Agent, or Firm* — Fenwick & West LLP

(57) ABSTRACT

A local communications apparatus is aligned with a remote apparatus, each apparatus comprising radio frequency (RF) and free space optical (FSO) transceivers with substantially parallel boresight. Coarse alignment is performed using the RF transceiver and fine alignment is performed using the FSO transceiver. A patterned search is performed to locate the RF signal from the remote apparatus and known features of the intensity profile are utilized to locate the global maximum, thus coarsely aligning the pair of apparatuses. A second patterned search is performed to locate the FSO signal from the remote apparatus and an iterative step-search is used to align the FSO signal centroid with the FSO transceiver, thus finely aligning the pair of apparatuses.

29 Claims, 11 Drawing Sheets

(56) References Cited

U.S. PATENT DOCUMENTS

| | | | |
|---|---|---|---|
| 2006/0018661 A1* | 1/2006 | Green | H04B 10/1127 398/128 |
| 2006/0018663 A1* | 1/2006 | Moursund | H04B 10/1125 398/135 |
| 2006/0024061 A1* | 2/2006 | Wirth | H04B 10/1125 398/129 |
| 2006/0291864 A1* | 12/2006 | Pavelchek | H04B 10/2587 398/129 |
| 2007/0031150 A1* | 2/2007 | Fisher | H04B 10/118 398/128 |
| 2007/0127926 A1* | 6/2007 | Marioni | H04B 10/1121 398/118 |
| 2007/0223929 A1* | 9/2007 | Graves | H04B 10/1121 398/122 |
| 2008/0275572 A1* | 11/2008 | Tillotson | B60L 8/00 700/1 |
| 2012/0002973 A1* | 1/2012 | Bruzzi | H01Q 13/0208 398/116 |
| 2012/0068880 A1* | 3/2012 | Kullstam | G01S 3/38 342/54 |
| 2012/0308235 A1* | 12/2012 | Pusarla | H04B 10/112 398/79 |
| 2012/0308239 A1* | 12/2012 | Sheth | H04B 10/118 398/131 |
| 2013/0315604 A1* | 11/2013 | LoPresti | H04B 10/1123 398/116 |

* cited by examiner

RAPID IN-THE-FIELD AUTO-ALIGNMENT FOR RADIO FREQUENCY AND FREE-SPACE OPTICAL DATA COMMUNICATION TRANSCEIVERS

CROSS-REFERENCE TO RELATED APPLICATIONS

This application claims the benefit of U.S. Provisional Patent Application No. 61/771,835, entitled "Rapid In-The Field Auto-Alignment For Radio Frequency And Free-Space Optical Data Communication Transceivers," filed on Mar. 2, 2013, which is hereby incorporated by reference in its entirety.

BACKGROUND

1. Field of Invention

This application relates to both radio frequency as well as free space optical data communication, particularly to transceiver alignment.

2. Description of the Related Arts

In 2003, the FCC-licensed for use 13 GHz of spectrum in the 70 GHz and 80 GHz bands, also known as the E-band millimeter wave Radio Frequency (RF) spectrum. Ten bands in this spectrum were made commercially available for a broad range of fixed wireless applications operating at gigabit data transfer rates. Applications include point-to-point local wireless networks and broadband internet access. Communication of data through E-band signals potentially serves as a cheap alternative to more costly fiber solutions, particularly in urban areas due to the cost of laying fiber. E-band RF data transfer is a particularly cost effective solution for filling the gap for short-haul wireless connectivity in the so-called "last mile" between network service providers and customers. E-band RF data transfer can also offer data rates that overlap with lower the end of rates available with fiber-based solutions.

Because of its location in the radio frequency spectrum (71-76 and 81-86 GHz), E-band data transmission is not very susceptible to interference due to fog, airborne particulates such as dust and atmospheric turbulence. E-band data transmission, however, is susceptible to degraded performance due to rain. Rain interferes with radio wave transmission in the E-band such that during a rain storm, data transmission would necessitate repeated data retransmission at best or interrupted service at worst. Further, radio waves in the E-band have a narrow, pencil beam-like characteristic, and as a result antennas producing E-band signals can be placed in close proximity to one another without concern for adjacent channel interference. However, due to the narrow pencil-like characteristic of the E-band RF beam, an E-band transmitter must be precisely pointed at its receiver in order to ensure data transmission.

Free-space optical communications links can also be used advantageously in telecommunications. Compared to other communications technologies, a free-space optical communications link can have advantages of higher mobility and compact size, better directionality (e.g., harder to intercept), faster set up and tear down, and/or suitability for situations where one or both transceivers are moving. Thus, free-space optical communications links can be used in many different scenarios, including in airborne, sea-based, space and/or terrestrial situations. An FSO transceiver that outputs an optical signal with wavelengths centered about 1550 nanometers is eye-safe and can be adapted to FSO commercial communications. FSO transmission is, however, subject to disruptions due to fog, snow, airborne particulate matter, and atmospheric turbulence. Additionally, FSO signals are transmitted as optical beams, and thus are even narrower and require even more precise alignment than RF beams.

Further, twist and sway movements due to wind and other weather can easily disrupt both E-band and FSO data transmission versus data transmissions that occurs at lower frequencies.

SUMMARY

Embodiments of an integrated apparatus for free space data transmission combine millimeter wave (mmW) Radio Frequency (RF) data transmission with Free Space Optical (FSO) data transmission on a common stabilized assembly. The apparatus may be used as part of a larger commercial communications network. The apparatus ensures high level of carrier availability, even under stressing environmental conditions. The apparatus further ensures that at least a mmW RF control back channel remains operational in the unlikely event that both the RF and FSO data transmission links go down at the same time, for example if heavy rain and dense fog occur simultaneously.

Due to the narrowness of both the mmW RF and FSO carrier beams, a high degree of alignment is required between a local combined apparatus and a similar remote combined apparatus. Coarse alignment is initially provided by the mmW RF transceiver of each apparatus, after which fine alignment is performed by the FSO transceiver of each apparatus. The alignment mechanism can also correct for environmental effects that would otherwise disrupt communication by either of the apparatuses (e.g., cell site vibration and sway).

In one embodiment, the coarse alignment includes adjusting the orientation of the apparatuses in a patterned search until the received intensity of the RF signal is greater than a threshold value. The orientation of the local apparatus is then adjusted based on the spatial gradient in intensity of the received RF signal to locate a local maximum in the intensity of the RF signal ("hill climbing") while the remote apparatus is held stationary. The orientation of the local apparatus is then adjusted in a search pattern while the remote apparatus is held stationary until the intensity of the received RF signal is greater than the local maximum ("lobe mapping"), assuming that the local maximum previously found was not the global maximum. The coarse alignment concludes by performing another hill climbing operation to locate the global maximum in the intensity of the RF signal. In this way, the local apparatus is coarsely aligned with the remote apparatus. Hill climbing and lobe mapping operations are then repeated in a reverse fashion to coarsely align the remote apparatus with the local apparatus.

In one embodiment, the fine alignment includes adjusting the alignment of the apparatuses in a patterned search until the received intensity of the FSO signal is greater than a threshold value. The orientation of the local apparatus is then adjusted to perform an ordered search to locate the centroid of the received FSO signal while the remote apparatus is held relatively fixed. In this way, the local apparatus is finely aligned with the remote apparatus. An ordered search operation is then repeated in a reverse fashion to finely align the remote apparatus with the local apparatus. In one embodiment, two different ditherings are used at each of the apparatuses in order to account for motion of apparatuses during fine alignment. This dithering is generally deactivated once fine alignment has been completed.

Other features and objectives will be apparent from the following description and claims and are illustrated in the accompanying drawings, which by way of illustration, show preferred embodiments and the principles thereof. Other embodiments with the same or equivalent principles may be used and structural changes may be made as desired by those skilled in the art without departing from the scope or purview of the appended claims.

DETAILED DESCRIPTION OF EMBODIMENTS

General Overview and Benefits

An integrated communication apparatus may be used as part of a commercial communications network to facilitate the exchange of fully duplexed data with another similar device. The apparatus is configured to maintain high carrier availability, or uptime, even in adverse weather conditions. The apparatus includes two transceivers, a millimeter wave (mmW) Radio Frequency (RF) transceiver, and a Free Space Optical (FSO) transceiver. In one embodiment, the mmW RF transceiver operates in the E-band RF range, for example 13 GHz of spectrum in the 70 GHz and 80 GHz radio frequency bands. In other embodiments, the mmW RF transceiver is capable of operating outside the E-band RF range. The mmW RF transceiver may be used to transmit data and/or establish a link with an adjacent apparatus.

The auto-alignment and tracking method is designed for use with the integrated communications apparatus to allow for efficient link acquisition, using an inertially stabilized gimbal assembly of the apparatus to achieve high link stability. The apparatus and technique for its use are particularly valuable for connections that are subject to interruption from weather effects and other causes of interference, such as twist and sway of whatever the integrated communications apparatus is mounted on (e.g., a communications tower). The combination of mmW RF and FSO transceivers is complimentary, whereby the FSO supports connectivity during rain, which interrupts mmW RF transmission, and conversely the mmW RF supports connectivity during conditions where fog, snow, airborne particulate matter, and atmospheric turbulence interrupt the FSO.

The mmW RF transceiver is used to coarsely align and track the communications apparatus and the FSO transceiver is used for fine alignment and tracking. This decreases the time required to acquire a link. Using the mmW RF to coarsely align the apparatus reduces the range over which the FSO transceiver has to search to complete the connection process, thereby speeding up acquisition time. Consequently, the amount of downtime in the communications link is reduced, as less time is required to reestablish the connection any time the link is broken.

Apparatus Structure

Figure 1:
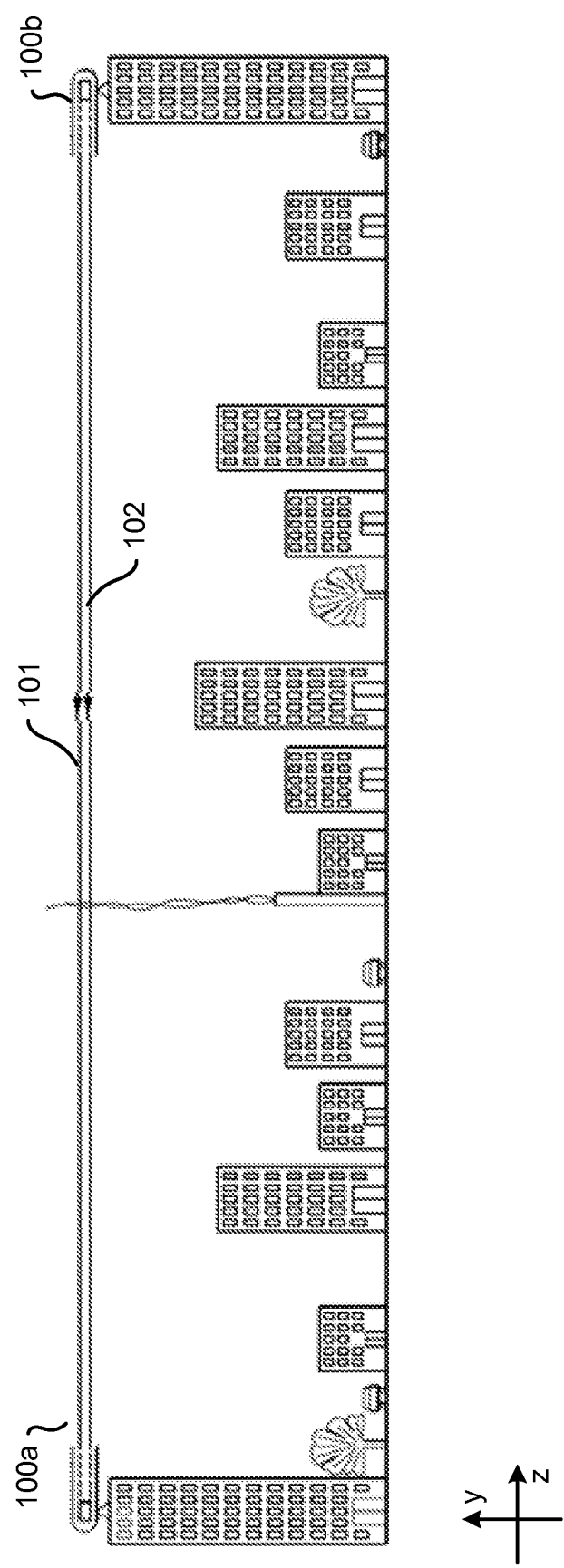
FIG. 1 is a system diagram of at least a portion of an integrated commercial communications network using two integrated communications apparatuses to communicate through free space.

FIG. 1 is a system diagram of an integrated commercial communications network using two integrated communications apparatuses 100 to communicate through free space. An integrated communications apparatus 100a located at a first physical location (or "node") is configured to communicate with another integrated communications apparatus 100b at a second node located remotely from the first node. The two apparatuses 100 do not have to be identical, so long as both devices are capable of transmitting and receiving both mmW RF 101 and FSO 102 transmissions at the relevant frequencies. The transceivers of the local apparatus 100a are directed at another similar remote device 100b positioned a physical distance away within line of sight.

The distance between apparatuses may depend upon a number of factors including, for example, historical weather data for the area being serviced. For example, if the service area frequently experiences rain or fog, the distance between sites may be smaller than if these weather conditions are less frequent or severe. Often, an apparatus will be positioned at a prescribed height above ground to prevent interruption of line of sight due to building or landscape features. The apparatuses may be land-based, maritime-based (i.e., mounted on a seaborne vessel), or airborne.

Figure 2:
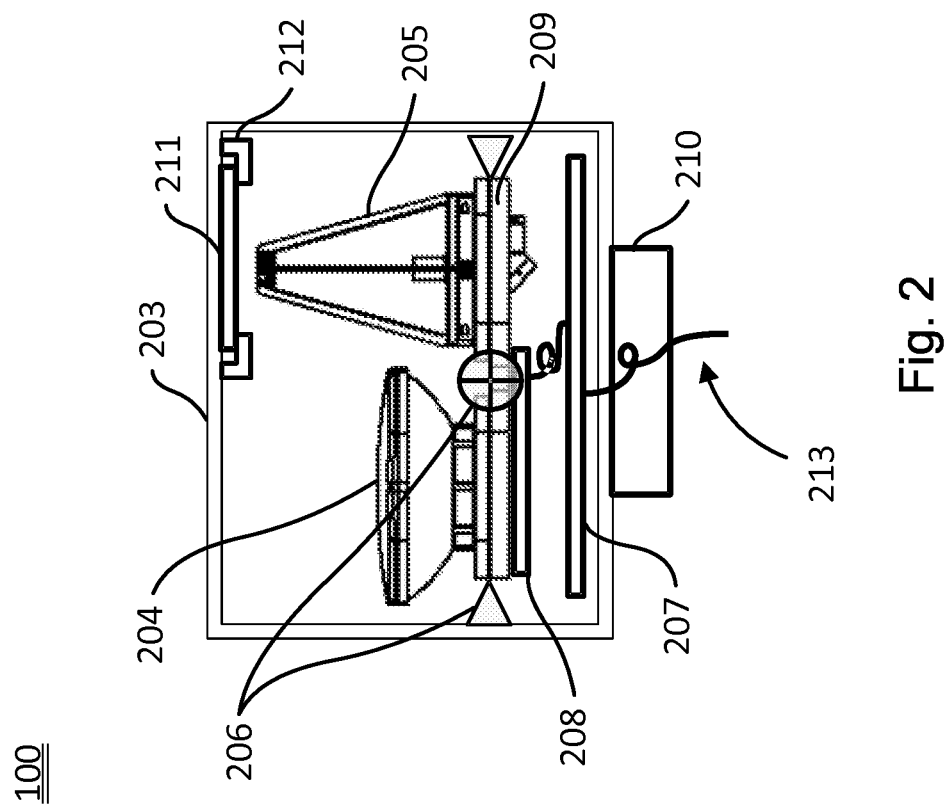
FIG. 2 is a side view of an integrated communications apparatus including an E-band mmW RF and a FSO transceiver, both mounted onto a gimbal-controlled platform, according to one embodiment.

FIG. 2 is a side view of an integrated communications apparatus including an E-band mmW RF transceiver 204 and a FSO transceiver 205, both mounted onto a gimbal-controlled platform, according to one embodiment. The apparatus 100 includes an environmental enclosure 203. Inside the environmental enclosure 203, the mmW RF transceiver 204 and the FSO transceiver 205 are coupled to the gimbal assembly 206. In another embodiment, the gimbal assembly 206 is located external to the environmental enclosure 203.

The environmental enclosure 203 includes one or more apertures 211 for transmitting signals. Each aperture 211 is transparent to the transmissions of at least one of the transceivers 204, 205. In one embodiment, each transceiver has a corresponding aperture that is constructed using a material that is transparent to the transmissions of its associated transceiver. In another embodiment, the environmental enclosure 203 has a single common aperture, made of a material having qualities that allow propagation of both E-band mmW RF 101 and FSO 102 transmissions. In the example embodiment shown in FIG. 2, the apparatus 100 has only a single aperture 211. In this embodiment, the housing of the environmental enclosure 203 is substantially transparent to mmW RF transmissions 101, obviating the need for an mmW RF aperture. The aperture 211 corresponds to the FSO transceiver 205 and includes an optical window that is transparent to FSO transmissions 102.

The environmental enclosure 203 provides protection against environmental deterioration or destruction for all internal electrical and mechanical components of the apparatus. In one embodiment, the environmental enclosure 203 may also provide for internal environment control of properties such as temperature, humidly, condensation, and moisture. The environmental enclosure 203 may also employ a heater, wiper, or other mechanism 212 to preclude or limit precipitation, ice formation, dirt build-up on the aperture 211 inhibiting the transparency of the aperture.

Both the mmW transceiver 204 and the FSO transceiver 205 are mounted on a moving platform 209. In one embodiment, the moving platform 209 is connected to the environmental enclosure 203 through gimbal assembly 206. Gimbal assembly 206 allows the transceivers to rotate within a range of motion on two axes dimensions, in order to assist the transceivers in forming communications links with another similar remote apparatus. Through their common mounting on the moving platform 209, the motion of both is controlled by the gimbal assembly 206. The gimbal assembly 206 is inertially stabilized to reduce the impact of motion of environmental disclosure 203, such as sway of a mounting tower due to environmental conditions. The transceivers share near-parallel boresights.

The environmental enclosure 203 also contains a stationary platform circuit board 207 and a moving platform circuit board 208 which together transmit, receive, and process data. The stationary platform circuit board 207 is located off of the moving platform 209, and thus does not move with gimbal 206 motion. The stationary platform circuit board 207 exchanges power and data with an external computer network separate from the apparatus 100 through cables and/or fibers 213 that pass through a port 210 in the environmental enclosure 203.

The moving platform circuit board 208 is located on the moving platform 209. The moving platform circuit board 208 includes those electronics that are only able to function in close proximity to the transceivers, or are best able to function in close proximity to the transceivers. Generally, it is preferable to minimize the mass and heat loading of the gimbal assembly 206. Thus, electronics not required to be on the moving platform circuit board 208 are instead located on the stationary platform circuit board 207. Removing unnecessary electronics from the moving platform circuit board 208 has the added benefit of minimizing the thermal loading of the moving platform 209. In one embodiment, no electronics require close proximity to the transceivers, thus the moving platform circuit board 208 is omitted and all electronics for the apparatus are located on the stationary platform circuit board 207.

Data received at the transceivers is communicated to the moving platform circuit board 208, which may perform some data processing before sending the data to the stationary platform circuit board 207 for possible further processing. The stationary platform circuit board 207 sends the data to external electronics through cables 213.

Apparatus Structure with Respect to Auto-Alignment

Figure 3:
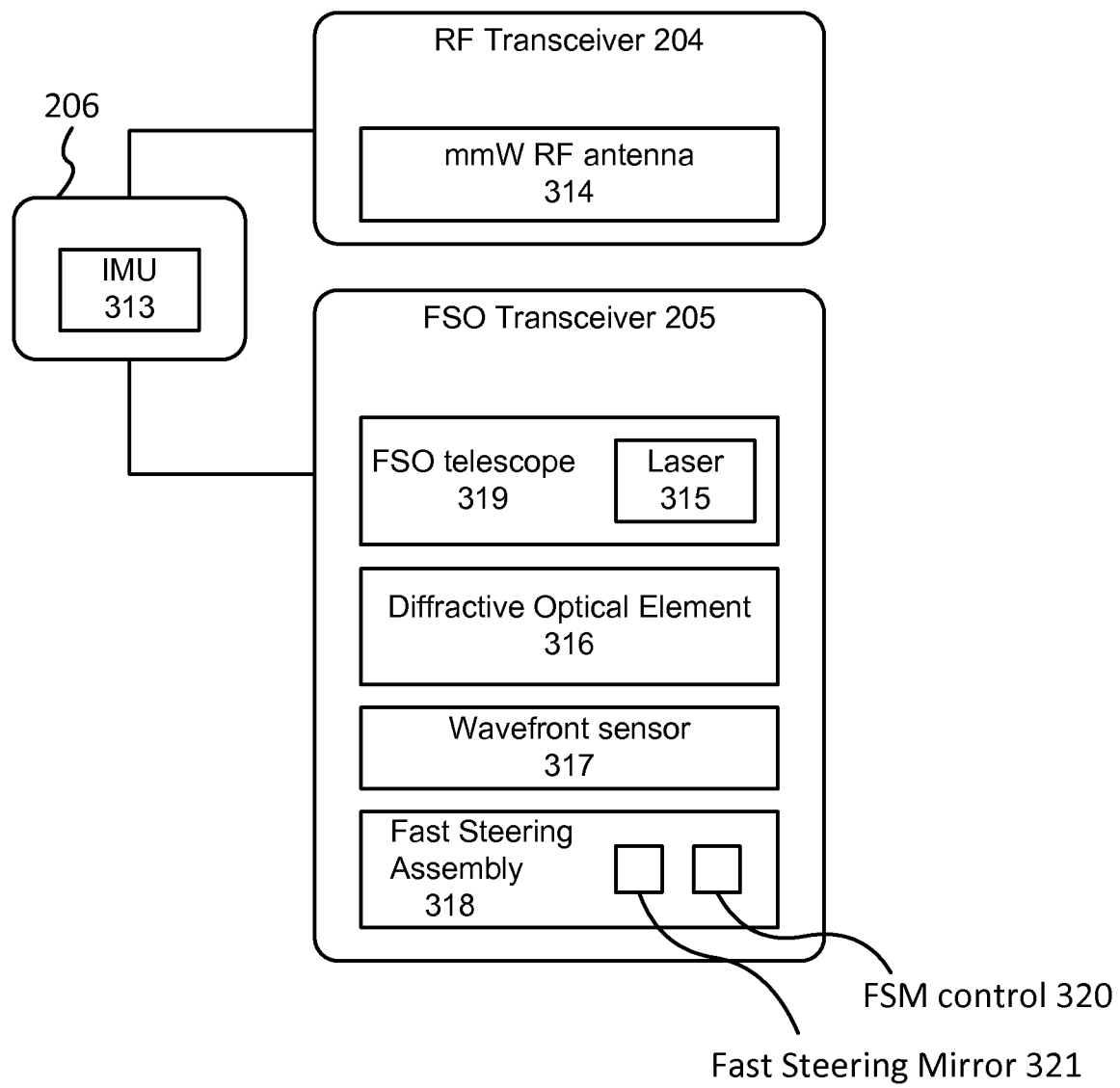
FIG. 3 is a block diagram illustrating the components of the transceiver related to signal acquisition and auto-alignment, according to one embodiment.

FIG. 3 is a diagram illustrating the components of the transceivers related to signal acquisition and transceiver alignment, according to one embodiment. The transceivers 204 and 205 of the local apparatus 100a work in conjunction with the gimbal assembly 206 and a Fast Steering Assembly 318 to automatically align (auto-align) the apparatus with a corresponding remote apparatus 100b to establish RF and FSO communications links for data exchange.

Gimbal assembly 206 provides stabilization for the transceivers, and controls coarse motion for the movable platform 209 containing the transceivers. The gimbal assembly 206 is electronically coupled to the transceivers and uses transmissions they receive to orient the movable platform 209 towards a remote apparatus in order to establish FSO and mmW communications links. The gimbal assembly 206 also responds to external weather influences that would affect the position and orientation of the movable platform 209. The gimbal assembly 206 includes an Inertial Measurement Unit (IMU) 313 for inertial stabilization which provides a local frame of reference for the position, velocity, and angular rotation of the gimbal assembly 206. The IMU 313 may include, for example, accelerometers and gyroscopes. Thus, the IMU is capable of detecting motion of the movable platform 209 due to external weather forces that cause apparatus motion, such as twist and sway.

The mmW RF transceiver 204 includes a mmW RF antenna 314 for transmitting and receiving mmW RF transmissions. In one embodiment, the mmW RF antenna 314 is 0.3 meters in diameter, and has a field angle of approximately 0.9 degrees. The mmW RF transceiver 204 is used in coarse alignment of the integrated communications apparatuses 100, as well as in data transmission.

The mmW RF transceiver 204 is configured to operate with a send channel and a receive channel. A channel is a band of frequencies at which the transceiver 204 sends and/or receives data. In one embodiment, the send channel of the local apparatus 100a is a 2.5 GHz band centered around 73 GHz and the receive channel of the local apparatus is a 2.5 GHz band centered around 83 GHz. In another embodiment, the send channel a band centered at 73 GHz+1.25 GHz (or 74.25 GHz), and the receive channel is a band centered at 73 GHz−1.25 GHz (or 71.75 GHz), or vice versa. In another embodiment, the send channel is a band centered at 83 GHz+ 1.25 GHz (or 84.25 GHz) and the receive channel is a band centered at 83 GHz−1.25 GHz (or 81.75 GHz), or vice versa.

The send and receive channels of the remote apparatus 100b have the same frequencies and bandwidths as the local apparatus, but are reversed. Thus, data sent by the local apparatus 100a can be received by the remote apparatus 100b, and vice-versa. Separating the send and receive channels by bands of unused frequencies (e.g., 2.5 or 5 GHz apart) substantially eliminates cross-talk between two channels. The mmWF is further configured to modulate the carrier wave of the send channel with a lower frequency (e.g., 1 MHz) signal tone that is used in the auto-alignment process, as described in further detail below.

In one embodiment, the apparatus 100 also monitors the health of both mmW and FSO data links in real time using the lower frequency signal tone. In one embodiment, health monitoring also includes information regarding the real-time status of the gimbal assembly 206. This information may be externally communicated to a user interested in monitoring the health of the communications network links. In one embodiment, the data signal sent over the signal tone from a first apparatus 100a to a second apparatus 100b provides control information for the intensity with which the second apparatus should transmit optical signals via the FSO transceiver 205 from the second apparatus to the first apparatus. In this embodiment, the control information is based on the intensity of optical signals received at the FSO transceiver 205 of the first apparatus 100a.

The FSO transceiver 205 is used in fine alignment of integrated communications apparatus 100, as well as in data transmission. The FSO transceiver 205 includes a FSO telescope 319. The FSO telescope 319 includes a laser 315 for transmitting FSO transmissions. In one embodiment, the laser 315 consists of a fully duplexed eye-safe 1550 nm central wavelength laser carrier. In one embodiment, the FSO transceiver 205 includes a diffractive optical element 316, a wavefront sensor 317, and a fast steering assembly 318. The FSO transceiver 205 may additionally include adaptive optics (not shown). The diffractive optical element 316 diffracts incoming optical signals to generate an image at the wavefront sensor with substantially invariant dimensions, e.g., a 200 by 200 micron square. This improves the dynamic range of the FSO transceiver, allowing for better detection of the location of the other apparatus. In one embodiment, the wavefront sensor 317 includes a quad-cell and the fast steering assembly 318 includes a fast steering mirror (FSM) 321 and a FSM control 320.

The fast steering assembly 318 is used, at least in part, to fine control the field-of-view of the FSO transceiver 205 once coarse alignment has been established with remote apparatus 100b. In one embodiment, the FSM control 320 consists of a motor drive coupled to the FSM 321. By reorienting the FSM 321, the field-of-view of the FSO telescope 319 is changed, thus allowing FSO signal acquisition. The FSM control 320 may also be coupled to the gimbal 206 to control additional adjustments in the physical alignment of RF and FSO transceivers (204 and 205). Adjusting the gimbal 206 based on FSM information helps ensure that the FSO telescope 319 does not lose tracking by tracking to the edge of its field of view. Providing feedback to the gimbal 206 allows for reorientation of the entire apparatus to help both the mmW RF transceiver and the FSO 319 stay near the centers of their respective fields of view. For example, once alignment is complete, the gimbal assembly 206 may adjust the physical orientation of the transceivers such that the FSM 321 is returned to a default configuration (e.g., the center point of the FSM's stroke). Thus, the contribution of the FSM 321 does not accumulate over multiple alignments, thus reducing the likelihood that the FSM will reach the limit of its stroke.

General Auto Alignment Method

Figure 4:
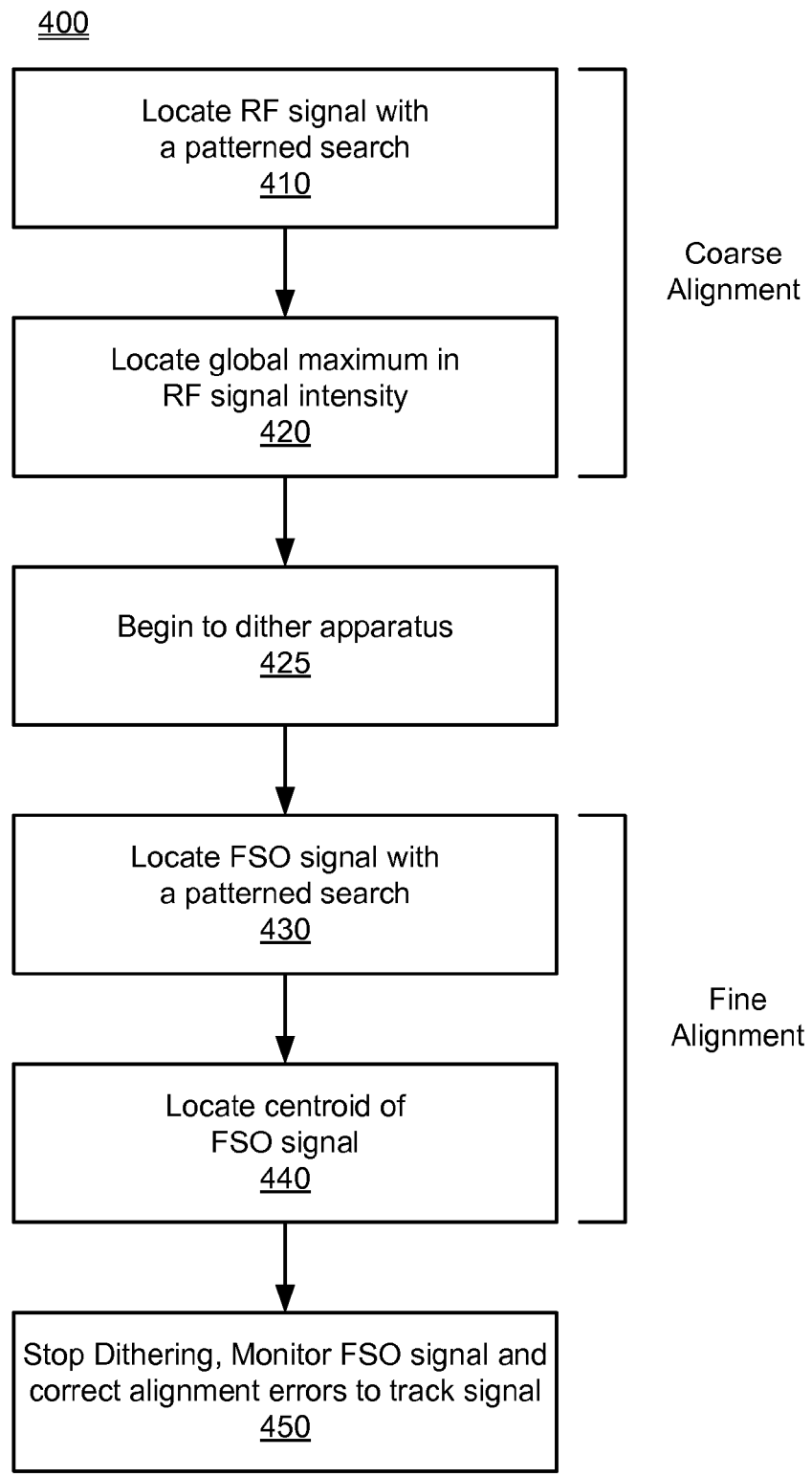
FIG. 4 is a flow chart illustrating the high-level steps of an auto-alignment method, according to one embodiment.

FIG. 4 is a flow-chart that illustrates the high-level steps of a method 400 for auto-alignment of local apparatus 100a and the corresponding remote apparatus 100b, according to one embodiment. The method 400 includes locating 410 an RF signal and locating 420 the global maximum in the intensity of the RF signal, collectively referred to as coarse alignment. The coarse alignment procedure functions to maximize, to the extent possible, the strength of the RF connection between the apparatuses 100. Once coarse alignment has been performed, the apparatuses begin 425 to be dithered. The method further includes locating 430 a FSO signal and locating 440 the centroid of the free space optical signal, collectively referred to as fine alignment. The fine alignment procedure maximizes, to the extent possible, the strength of the FSO connection between the apparatuses 100. Once fine alignment has been performed, dithering is stopped and the FSO signal continues to be monitored 450 to detect and correct drift in the alignment of the apparatuses 100. Various embodiments of the method 400 are described in greater detail below.

Coarse Auto Alignment

In one embodiment of coarse alignment (410 and 420), the local apparatus 100a and the remote apparatus 100b both transmit a consistent mmW RF signal tone as a modulation on top of the send carrier wave as described above. Each apparatus 100 uses the RF signal sent by the other apparatus to locate the other apparatus. Each apparatus 100 sends the signal while the gimbal 206 is rotated through a patterned search area so that the two apparatuses may detect each other's signals consequently locate each other.

To perform the patterned search, the gimbal assembly 206 sweeps the RF transceiver 204 through a search pattern while the RF transceiver simultaneously transmits the signal tone on the mmW send channel. The sweep consists of adjusting the position of the gimbal assembly 206 to change the orientation of the movable platform 209 on which the RF transceiver 204 is mounted. In one embodiment, the pattern of motion the gimbal assembly 206 is fixed and/or determined, though it may also be determined dynamically and adjusted based on the received signal. In one embodiment, the RF transceiver 204 of the remote apparatus 100b is simultaneously being swept through a different search pattern. The two search patterns used are chosen such that the RF transceivers 204 of the local apparatus 100a and the remote apparatus 100b are guaranteed to be directed towards each other at some point during the patterned search without the need for coordination between the apparatus 100 at the time of the search, thereby ensuring successful location determination 410. This assumes that both transceivers 100 are operational, that there is no obstruction between the apparatuses, and that the apparatuses are at least facing towards each other within the range of motion provided by the gimbal assemblies 206 (e.g., +/−3 degrees) prior to the search being performed.

Figure 5:
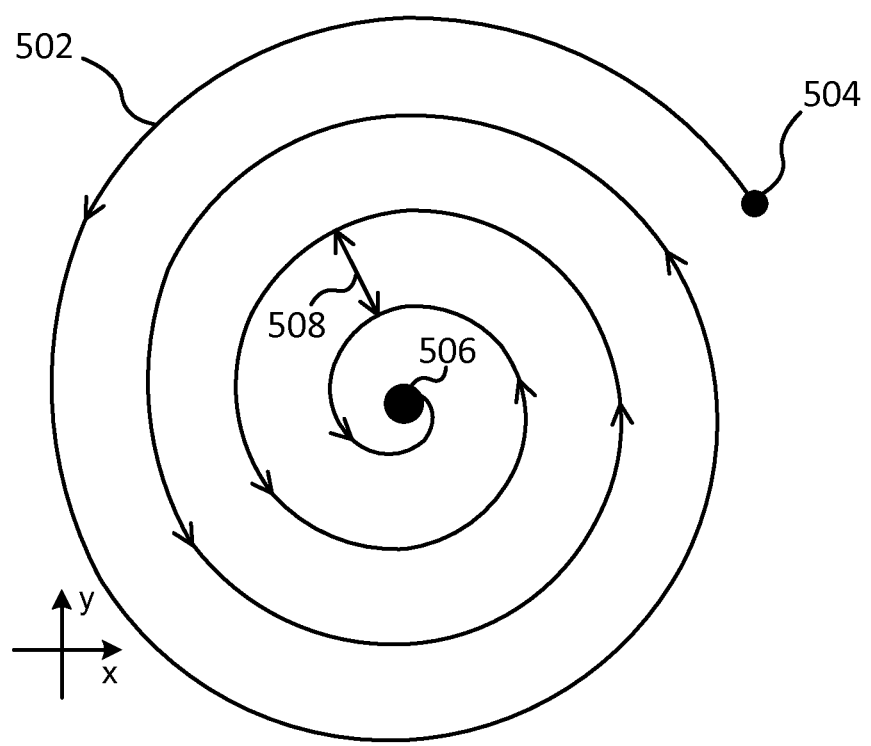
FIG. 5 illustrates the adjustment in orientation of an integrated communications apparatus and the corresponding remote apparatus, as part of a patterned search, according to one embodiment.

FIG. 5 illustrates the orientation adjustment for the local apparatus 100a and the remote apparatus 100b, in one embodiment of a patterned search. The illustrated orientation adjustment illustrates changes in orientation relative to the X/Y plane, where the distance between the apparatuses 100 is primarily along the Z axis (out of the plane of the drawing). Both apparatuses 100 initially use the same search pattern to enable alignment and tracking to begin without need for an existing communication channel between the apparatuses.

The illustrated search pattern minimizes the search area scanned for local apparatus 100a to find the remote apparatus 100b. The search path 502 followed by the local apparatus 100a begins with the apparatus oriented towards an arbitrary point 504 in the general area expected to contain the remote apparatus 100b (e.g., the maximum angle of motion of the gimbal assembly 206). The search path 502 spirals inwards around toward a central point 506 (e.g., the last known point at which a signal was detected, the center of the gimbal assembly's 206 motion), with each loop of the spiral having a fixed distance or angular separation 508 (e.g., 1 degree). Once the central point 506 of the spiral has been reached, the search path 502 spirals outward again to the starting point 504. This inward/outward motion is repeated until the apparatuses locate each other. While the apparatus 100a is following the search path 502, the remote apparatus 100b follows a similar path.

The two search paths 502 of the pair of apparatuses 100 are guaranteed to intersect if the range of motion for the pair of apparatuses is sufficient for the respective transceivers to be pointed directly towards each other for at least one point along the path of motion of each transceiver's search. The apparatuses 100 follow their respective search paths 502 until the intensity of the received RF signal exceeds a threshold value. The threshold value is set such that background RF signals are unlikely to trigger a false indication of alignment.

In other embodiments, other search patterns are used. For example, instead of a spiral a horizontal zig-zag search pattern can be used (not shown). The zig-zag pattern can include rounded edges in order to make the search pattern consume less energy and require less abrupt changes in direction. In one embodiment, the angular coverage in each direction may differ. For example, if the search area to be covered is 2 degrees in the horizontal direction and 6 degrees in the vertical direction, the search pattern can be anisotropic along different axes. For example, the spiral may be oval shaped or the zig-zag may appear in aggregate as covering a flat rectangular search area, for example extending two degrees in the vertical direction and six degrees in the horizontal direction.

Referring again to FIG. 4, once the RF signal has been located 410, the method 400 proceeds by locating 420 the global maximum in the received RF signal intensity. One embodiment for locating 420 the global maximum is described below with reference to FIGS. 6A-C. The following method of performing iterated hill-climbing and lobe-mapping operations is performed first by the local apparatus 100a and then by the remote apparatus 100b, or vice-versa. In other embodiments, different techniques for locating 420 the global maximum are used.

Figure 6A:
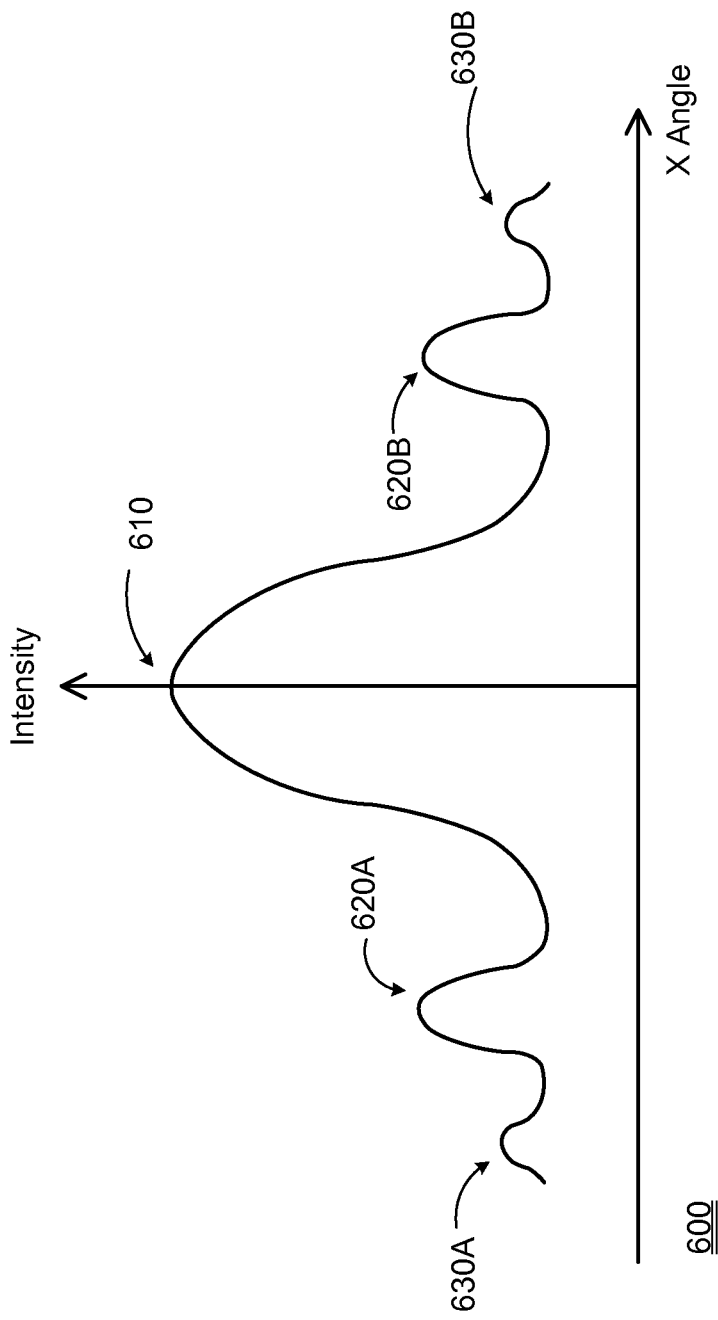
FIG. 6A is an example intensity profile illustrating the variation of received intensity with angle for a received RF signal.

FIG. 6A shows an intensity profile 600 for the RF transceiver 204 of a local apparatus 100a, illustrating the variation in RF signal intensity received from the remote apparatus 100b, as a function of angle. On the X axis of the profile, angle represents the angle of the RF transceiver 204 of the local apparatus 100a. The intersection of the highest RF signal intensity with the center of the x axis is arbitrary, and in practice, the profile may appear at any angle. The intensity profile includes a central maximum 610, which corresponds to one of the RF transceivers 204 of the pair of apparatus 100 being substantially (coarsely) aligned with the RF transceiver of other apparatus. On either side of the central maximum 610 are a pair of secondary maxima (620A and 620B), followed by a pair of tertiary maxima (630A and 630B). When viewed in two dimensions (e.g., X and Y) it can be seen that the secondary maxima (620A and 620B) are the two points on the x-axis that intersect a secondary maximum ring 620 that is centered around the central maximum (see FIG. 6C). Similarly, the tertiary maxima (630A and 630B) are the two points on the x-axis that intersect a tertiary maximum ring 630. An intensity profile may include higher order maxima at higher angles (not shown).

Figure 6B:
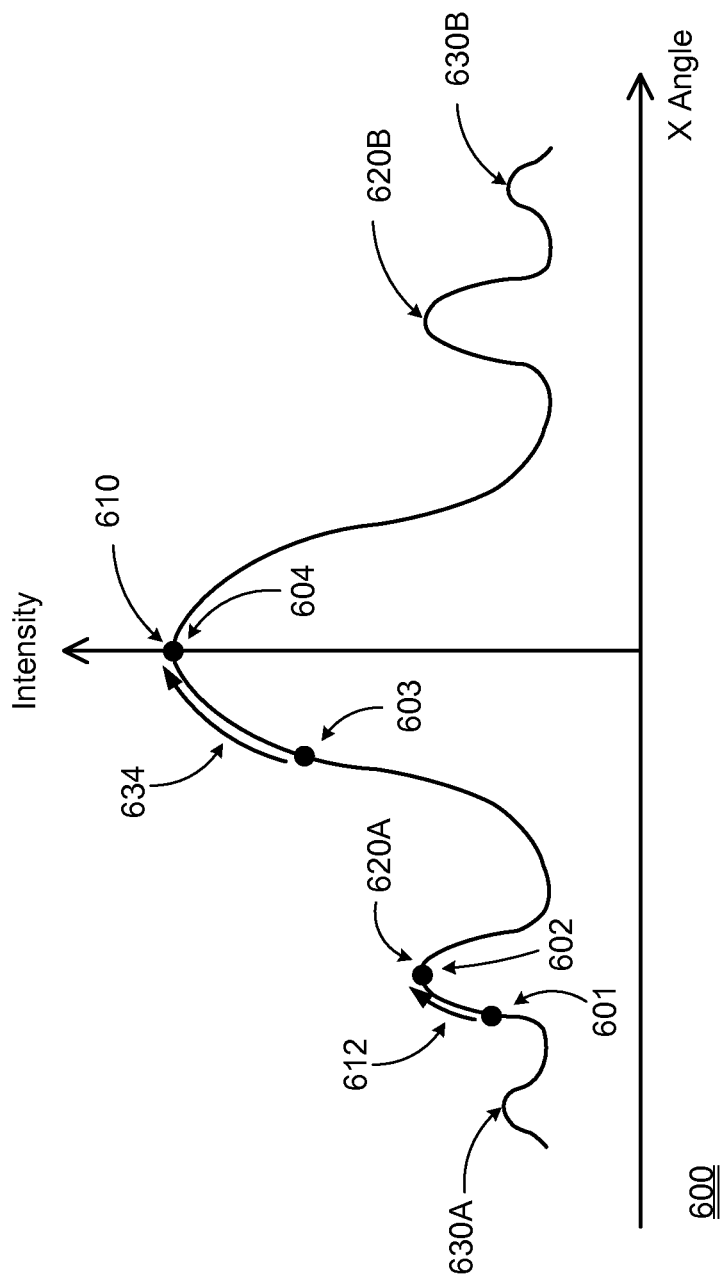
FIG. 6B illustrates hill climbing during auto-alignment using the example intensity profile of FIG. 6A, according to one embodiment.

FIG. 6B shows the intensity profile 600 shown in FIG. 6A and illustrates an aspect of locating 420 the global maximum that is referred to herein as "hill-climbing", according to one embodiment. FIG. 6B assumes that a prior patterned search, as described above, has located 410 an RF signal above a threshold value, in this case, at a point 601 on the side of one of the secondary maxima 620A. Note that in this example the tertiary maximum 630A was not strong enough to exceed the threshold, and thus was not identified as corresponding to the RF signal during the patterned search. The peak intensity of the secondary maximum 620A, the local maximum, occurs at point 602. During hill-climbing, the gimbal assembly 206 adjusts the orientation of the RF transceiver 204 so as to "climb" the gradient of the intensity profile 600 along the path indicated 612, ending at the local maximum 602. In one embodiment, the direction of the hill-climbing is determined by a two dimensional trial and error method. The x orientation of the RF transceiver 204 is adjusted in one direction by a small amount. If the received intensity decreases, a small adjustment in the opposite direction is tried. The same technique is applied to adjusting the y orientation of the RF transceiver 204. The x and y orientations of the RF transceiver 204 are adjusted until the local maximum has been identified, indicated by a small change in orientation in any direction resulting in a reduction in the received intensity. Fluctuations in the received signal may be present that make it difficult to determine the exact maximum. To address this issue, motion may be stopped near the peak and received signal may be processed over time to see if the time average of the received signal intensity has flattened (e.g., the slope of the received signal intensity over time is close to zero).

Figure 6C:
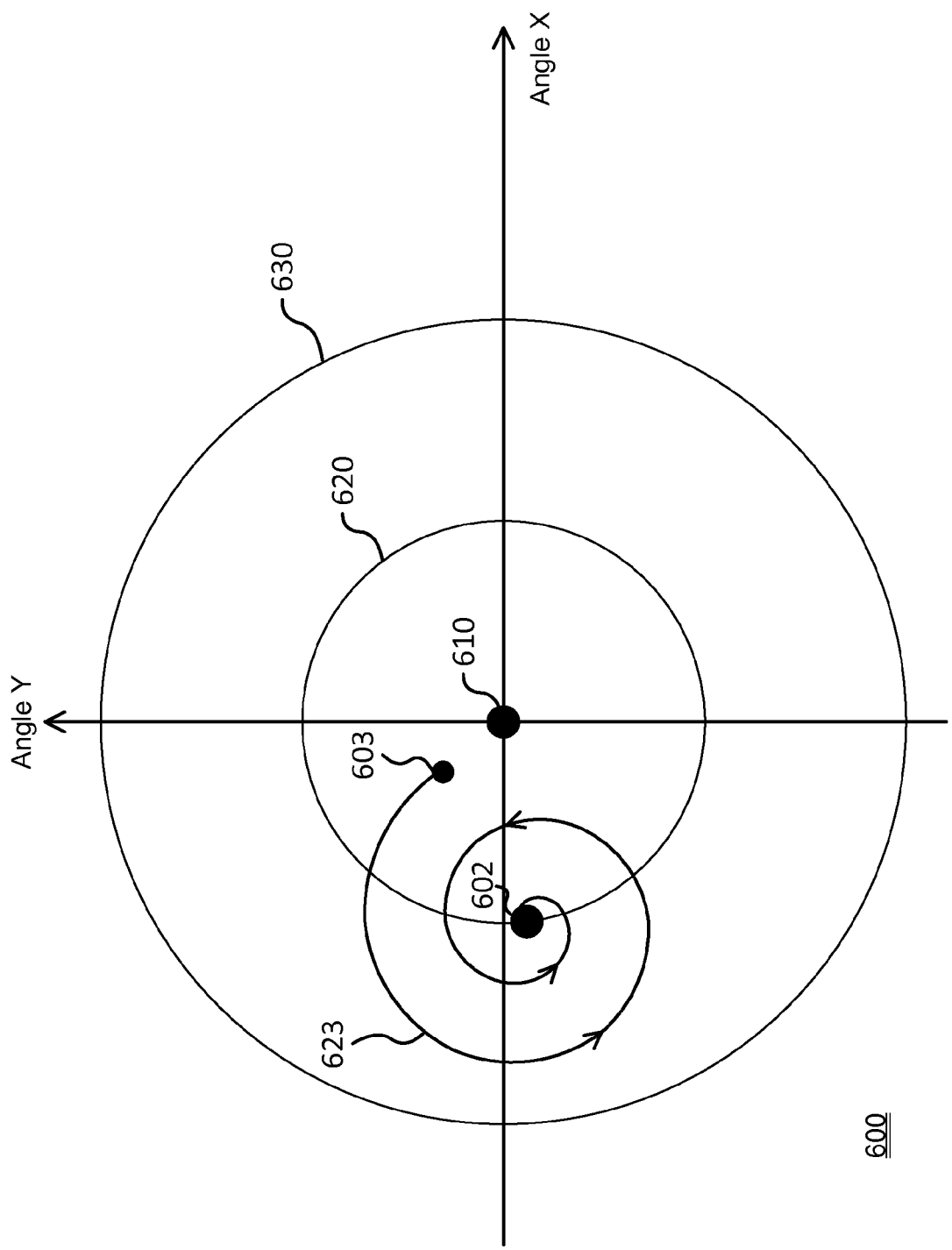
FIG. 6C illustrates lobe mapping during auto-alignment for the example intensity profile of FIG. 6A, according to one embodiment.

Once the local maximum 602 has been identified, a technique referred to herein as "lobe-mapping" is used to identify whether the local maximum is also the global maximum. FIG. 6C illustrates lobe-mapping for the intensity profile 600, according to one embodiment. When viewed in two dimensions (e.g., angle in X and angle in Y) the global maximum 610 occurs at a point, while the secondary 620 and tertiary maxima 630 can be seen to be rings centered on the global maximum. Starting at the identified local maximum 602, the gimbal assembly 206 changes the orientation of the RF transceiver 204 of the local apparatus 100a through a patterned search (e.g., a spiral such as mapping path 623, similar to the pattern previously described). During lobe-mapping, in contrast to local apparatus 100a, the remote apparatus 100b does not move (i.e., it remains fixed). The signal intensity received by the RF transceiver is monitored until it exceeds the signal intensity detected at the previously identified local maximum 602. At point 603, the received RF signal is greater than it was at the local maximum 602, thus indicating that the identified local maximum 602 is not the global maximum 610.

In one embodiment, the mapping path 623 will continue to diverge from the local maximum 602 until a higher intensity signal (e.g., point 603) or until one or more break out criteria are met. For example, the mapping path 623 may continue until the extent of the motion of the gimbal assembly 206 is reached or the angular difference between the local maximum 602 and the current position on the mapping path 623 exceeds a threshold angle. The expected angular distance between maxima can be determined based on the signal frequency. Thus, if the mapping path 623 does not detect a higher signal intensity after diverging by more than the determined angular distance between maxima, it can be inferred that the identified local maximum is also the global maximum. In one embodiment, the threshold angle is set to be equal (or slightly larger than) the expected angular distance between maxima.

Once a signal of higher intensity than the local maximum 602 has been identified (e.g., point 603) another hill-climbing operation is performed starting from the point of the newly discovered higher intensity signal (e.g., point 603). This process is illustrated in FIG. 6B. The starting point 603 is on the side of the central maximum 610. Again, the gimbal assembly 206 adjusts the orientation of the RF transceiver 204 to climb the gradient of the intensity profile 600 along the path indicated 634, ending at what is, in this case, the global maximum 604.

Once the maximum 604 is located 420, another attempted lobe-mapping operation confirms that the maximum is in fact the global maximum. If another, yet higher intensity maximum is present (e.g., if the initial RF signal search had initially located 410 tertiary maximum 630A, and thus the first lobe-mapping operation had located the peak of the secondary maximum 620A) then another iteration of hill-climbing and lobe mapping is performed to locate 420 the central maximum 610. The steps of performing hill-climbing and lobe-mapping can be iterated as many times as is required to locate 420 the central maximum 610.

Once the central maximum 610 has been located 420, the local apparatus 100a is considered to be coarsely aligned. The same process of hill-climbing and lobe-mapping is then repeated by the remote apparatus 100b while the local apparatus 100a is kept fixed. Once this process has been performed by both apparatuses 100, the pair of apparatuses is considered to be coarsely aligned.

In one embodiment, once the global maximum in the RF signal intensity has been located 420, the gimbal assemblies 206 of each apparatus 100 begin 425 to dither the orientation, thereby dithering the orientations of the transceivers 204 and 205. The local apparatus 100a and the remote apparatus 100b are dithered at different frequencies, for example, 2.5 Hz and 5 Hz, respectively. Consequently, the apparatus responsible for a change in the received RF signal can be identified from the observed frequency fluctuation of the change. As fluctuations due to various effects are expected, knowledge of which apparatus is responsible for a fluctuation in signal allows for improved diagnosing and correction of connection problems. Causes of such fluctuations include: weather effects, inertial stabilization drift and/or tower twist and sway. While the gimbal assembly 206 is dithering, the FSM 321 dithers with the same frequency, but 180° out of phase. Thus, the FSO signal is substantially unaffected by the dithering of the gimbal assembly 206. In one embodiment, dithering is performed during auto-alignment, and once auto alignment is complete, dithering of the gimbal assembly 206 and FSM 321 is stopped.

Fine Auto Alignment

The FSO signal from the FSO transceivers 205 has a lower angular spread than the RF signal. Thus, more precise alignment is required for FSO communication than for RF communication. Between two apparatuses 100a and 100b this is achieved by a fine alignment process that utilizes the FSO transceivers 205 of each apparatus 100. Referring again to FIG. 4, the fine alignment process begins by the local apparatus 100a locating 430 the FSO signal from the remote apparatus 100b. In one embodiment, a patterned search is implemented by the FSM controls 320 of each of the apparatuses 100. By controlling the orientations of the FSMs 321, the controls 320 adjust the effective orientation of each FSO transducer 205. Assuming coarse alignment has already been completed, the search pattern used guarantees intersection of alignment of the FSO transducers 205.

Typically, the magnitude of variation in orientation of the pair of apparatuses 100 during the fine alignment patterned search will be less than that used in the coarse alignment patterned search, as the prior coarse alignment narrows the area to be searched during fine alignment.

The patterned search 430 performed during fine alignment is similar to the patterned search 410 performed during coarse alignment. Rather than being carried out using the gimbal 206 and movable platform 209 as in coarse alignment, in fine alignment the search patterns is carried out by changing the orientations of the FSMs 321 of each apparatus 100. The FSMs 321 follow their respective search paths until the intensity of the received FSO signal exceeds a threshold value. The threshold value is set such that background signals are unlikely to trigger a false indication of alignment. In other embodiments, the effective orientations of the FSO transceivers 205 are changed in other ways, such as by adjustment of the orientation of the apparatuses 100 using gimbal assembly 206 and/or movable platform 209.

Figure 7A:
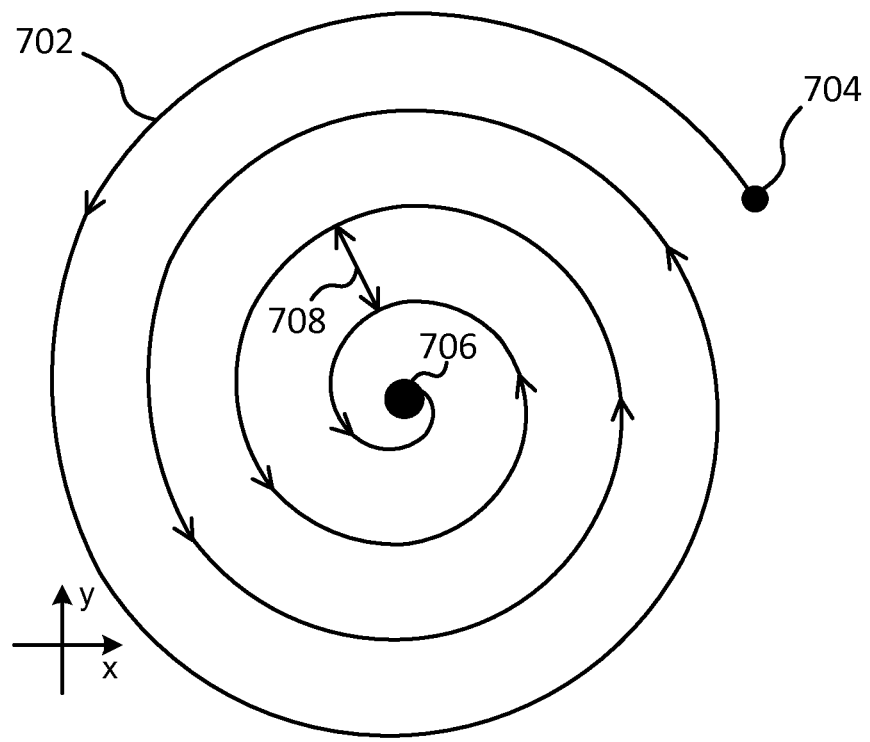
FIG. 7A illustrates the adjustment in orientation of the field-of-view of the FSO transceiver of a local integrated communications apparatus as part of a patterned search, according to one embodiment.
Figure 7B:
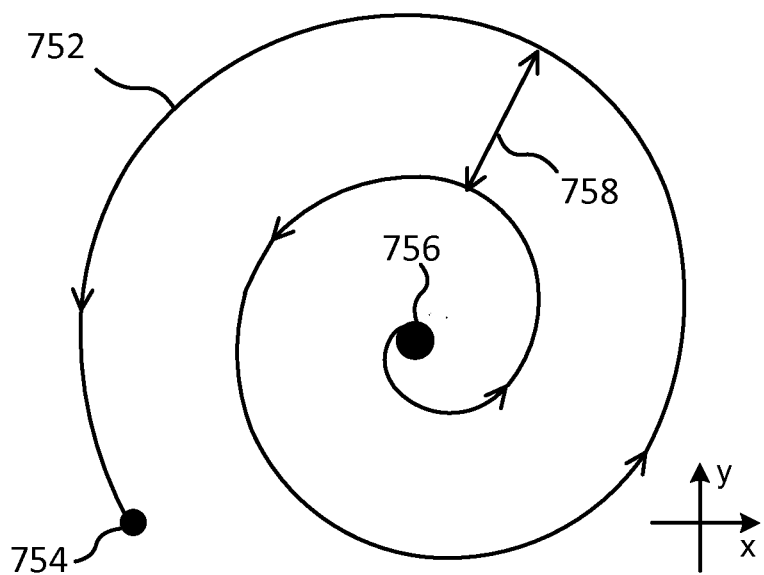
FIG. 7B illustrates the adjustment in orientation of the field-of-view of the FSO transceiver of a remote integrated communications apparatus that is paired with the local apparatus of FIG. 7A as part of a patterned search, according to one embodiment.

FIGS. 7A and 7B illustrate the orientation adjustment for the FSMs 321 of the local apparatus 100a and the remote apparatus 100b respectively, in one embodiment of a patterned search. The illustrated orientation adjustment illustrates changes in orientation relative to the X/Y plane of the RF signal transmitted by the transceiver, where the distance between the apparatuses 100 is primarily along the Z axis (out of the plane of the drawing).

The illustrated search pattern minimizes the search area scanned for the FSO transceiver 205 of the local apparatus 100a to find the FSO signal of the remote apparatus 100b. The search path 702 followed by the local apparatus 100a begins with the apparatus oriented towards the general area expected to contain the remote apparatus 100b, based on the previous coarse alignment. The search path 702 spirals inwards around toward a central point 706 (e.g., the last known point at which a signal was detected, or the center of the FSM's 321 motion), with each loop of the spiral having a fixed distance and/or angular separation 708 (e.g., 0.1 degrees). The search path 702 then spirals outward again, repeating the process until one of the FSOs sees the other.

While the apparatus 100a is following the search path 702, the remote apparatus 100b follows a complimentary path 752. The remote apparatus 100b begins at a central point 756 (e.g., the last known location of a signal, or the center of the FSM's 321 motion) and spirals outwards towards an end point 754 (e.g., the maximum stroke of the FSM 321). Each loop of the spiral is separated by a fixed angular distance 758 (e.g., 1 degree), with the distance 758 between loops for the remote apparatus 100b being significantly larger than the distance between loops 708 for the local apparatus 100a. The search path 752 then spirals inward again, repeating the process again until one of the FSOs sees the other.

Further, the apparatuses 100 progress through each of their respective search patterns at different rates. The differing search paths and different rates of progression through the search paths are due to the fact that the field-of-view over which each FSO transceiver 205 receives signal is wider than the beam-spread of the signal transmitted by the FSO transceiver. Thus, it is likely for the apparatuses to miss each other when transmitting and searching for FSO signals. In contrast, this is not the case for the mmW RF transceivers 204, which transmit and receive over the same field-of-view (hence why they may use the same search pattern).

In one implementation, the local apparatus 100a travels through search path 702 at a rate significantly faster than the rate at which the remote apparatus 100b travels through the search path 752. More specifically, the local apparatus 100a travels through search path 702 such that it spirals from point 704 to point 706 in the time it takes the remote apparatus 100b to travel only a fraction of the distance from point 754 to 756. The exact fraction may vary. If the remote apparatus travels too quickly, relatively, through its path, then the process may need to be repeated due to the FSOs missing each other on any given path. If the remote apparatus travels too slowly, the fine alignment takes too long. In one embodiment, the rate of travel through search path 752 is such that each time the local apparatus travels through search path 702, there is at least a 10-50% overlap in search area covered between iterations of the search path 702 by the local apparatus 100a.

The two search paths 702 and 752 are guaranteed to cause one FSO transceiver 205 to see the other if the range of motion for the pair of apparatuses 100 is sufficient for one of the transceivers to be pointed directly towards the other for at least one point along the path of motion of each transceiver's search. The apparatuses 100 follow their respective search paths 702 and 752 until the intensity of the received FSO signal exceeds a threshold value for at least one of the FSOs. The threshold value is set such that background FSO signals are unlikely to trigger a false indication of alignment. Generally, the apparatus traveling slowly through search path 752 will see the apparatus traveling through search path 702 quickly before the reverse occurs.

Once the incoming FSO signal has been located 430 by one of the FSOs, the initially locating apparatus 100 stops moving through its search pattern. Generally, the initially locating apparatus will be the apparatus moving slowly through search pattern 752. The other apparatus 100 continues moving through its search pattern. Periodically, the apparatus 100 that is still moving will move through the portion of its search pattern that aligns with the initially locating apparatus. This periodic signal is used by the initially locating apparatus to locate 440 the centroid of the incoming FSO beam from the other apparatus. Once the initially locating apparatus 100 has located 440 the centroid, the other apparatus 100 that may not have initially seen the initial locating apparatus is expected to now be able to see the initially locating apparatus. This other apparatus 100 now goes through the same centroid locating procedure to locate 440 the centroid of the signal being transmitted by the initially locating apparatus. In this instance, however, the initially locating apparatus 100 generally does not travel through a search pattern and instead remains fixed. Instead, at this point the apparatuses 100 should be sufficiently aligned to allow for centroid determination using a near constant signal impinging upon the other apparatus from the initially locating apparatus.

FIG. 8 describes an ordered search for determining the centroid of an incoming FSO signal, according to one embodiment. In one embodiment, the wavefront sensor 317 includes a quad-cell, and an incremental step search (e.g., a binary search) is performed to locate 440 the centroid of the incoming FSO beam. The incremental step search is implemented by using the FSM 321 of one apparatus 100 to adjust the field-of-view of the corresponding FSO transceiver 205 while the FSO transceiver of the other apparatus is held constant.

Figure 8A:
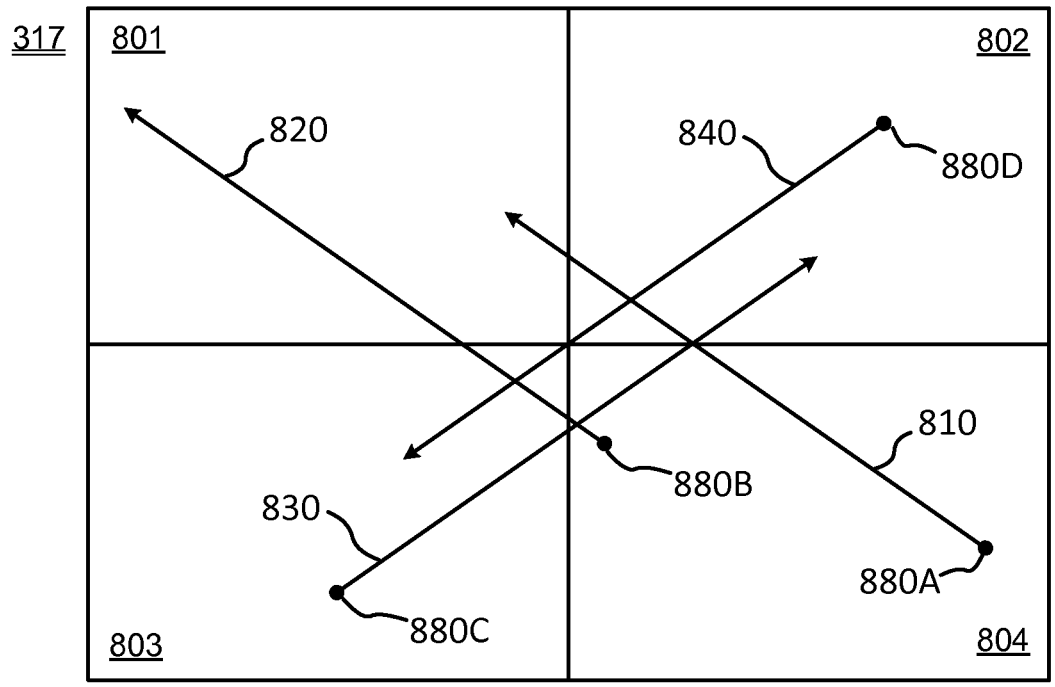
FIG. 8A is a diagrammatic representation of a quad-cell illustrating the first step, for a range of initial positions, in an ordered search for the centroid of an FSO signal, according to one embodiment.

FIG. 8A illustrates the quad-cell 317, which is made up of four quadrants 801, 802, 803, and 804. Each quadrant outputs the intensity of the optical radiation that is incident on it. Thus, if the intensity measured by any one of the quadrants exceeds a threshold value, the incoming FSO signal can be assumed to be responsible (assuming the threshold is set suitably high). Once the FSO signal has been located 430 in this manner, the incoming FSO beam is incident on at least one quadrant of the quad-cell 317.

In FIG. 8A, four possible incident positions are shown 880A-D. In one embodiment, the first step of an incremental step search comprises adjusting the orientation of the FSM 321 such that the incident position is changed by exactly one half the diagonal width of the quad-cell in the direction of the diagonally-opposite quadrant to the one on which the FSO beam is currently incident.

For example, for incident FSO beam 880A, the quad-cell 317 reports a signal in quadrant 804. The orientation of the FSM 321 is adjusted such that when a subsequent quad-cell reading is taken, the FSO beam 880A is incident in quadrant 801. This change is visually illustrated by path 810. Note that the quad-cell 317 measures only that the FSO beam is initially incident somewhere in quadrant 804, not the precise position within that quadrant. Moving the FSO transceiver 205 such that the subsequent reading occurs in quadrant 801 is a "best first guess" at the direction and distance to the center from the point 880A. Path 810 illustrates the direction of motion from quadrant 804 to quadrant 801.

The first step in an incremental step search is further illustrated by the FSO beam 880B, which is also incident in quadrant 804, and results in an FSM 321 orientation adjustment, the outcome of which is visually illustrated by path 820. Note that paths 810 and 820 are the same length and run parallel, but that path 820 results in the incoming FSO beam 880B being incident on a point further from the center of quad-cell 317 when the next reading from the quad-cell is taken. This is because point 880B was in fact quite close to the center, but the quad-cell 317 can detect only that point 880B is somewhere in quadrant 804, thus the initial "best first guess" over-compensates.

Additional first steps from other quadrants are also illustrated. FSO beam 880C is incident is quadrant 803, and thus the resulting adjustment in orientation of the FSM 321, as visually illustrated by path 830, results in the beam subsequently being incident in quadrant 802. Conversely, beam 880D is initially incident in quadrant 802 and path 840 results in the beam subsequently being incident in quadrant 803.

Figure 8B:
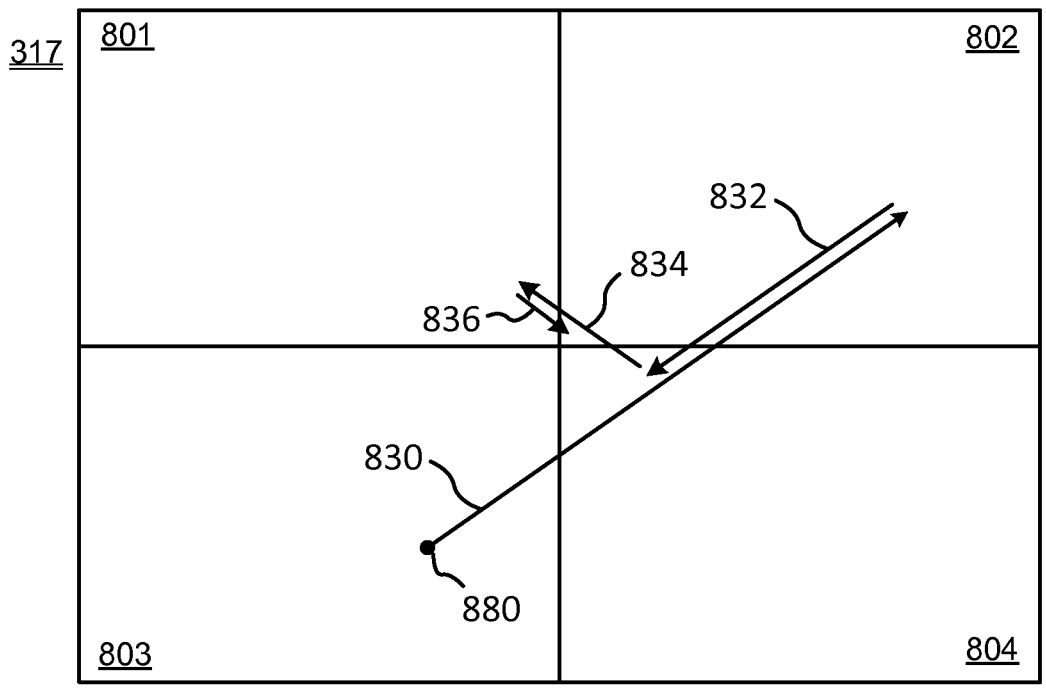
FIG. 8B is a diagrammatic representation of a quad-cell illustrating the steps in an ordered search for the centroid of an FSO signal, according to one embodiment.

FIG. 8B shows a complete incremental step search for a single starting position 880, in the bottom left quadrant 803 of the quad-cell 317. The first step 830 is as described with reference to FIG. 8A above, and overshoots the center point of the quad-cell 317 into the top right quadrant 802, as expected. The direction of the second step 832, and all subsequent steps in the iterative step search, is determined in the same manner as the direction of the first step. The amount of change in the orientation of the FSM 321 for the second, and all subsequent steps, is such that each step is progressively smaller than the prior step. In one embodiment, each subsequent step is half the size of the prior step. In other embodiments, other methods may be used to determine the length of the second (and subsequent) steps. In this case, as the incoming FSO beam is now incident in the top right quadrant 802, the second step 832 is back down toward the bottom left quadrant 803. However, since in this example the step size is half the size of the previous step, the second step 832 concludes with the incoming FSO beam being incident on the bottom right quadrant 804 instead. The second step 832 is shown slightly to one side of the first step 830 for clarity.

After the second step 832, the incoming FSO beam is now incident in on the bottom right quadrant 804 of the quad-cell 317. The third step 834 is therefore towards the top left quadrant 801. In the embodiment shown, the third step 834 is half the length of the second step 832. The fourth step 836 is half the length of the third step 834, and in this case, after the fourth step 836, the incoming FSO beam is incident in the upper right quadrant 802.

Although in FIGS. 8A and 8B, the FSO beam is illustrated as being a point, in reality the FSO beam will cover a non-trivial portion of the surface area of the quad cell 317, in part as a result of the diffractive optical element 316. The incremental step search continues until the incident FSO beam is substantially centered in the quad-cell 317, thereby locating 440 the centroid. When the incoming FSO beam is substantially centered, a portion of the beam will be incident on each quadrant of the quad-cell 317. One or more centroid-alignment conditions may be used to identify when the FSO beam is substantially centered in the quad-cell 317. In one embodiment, the incremental step search continues until all four quadrants measure an incident level of optical radiation above a threshold value. In another embodiment, the search continues until a pre-determined level of similarity between the levels recorded by each quadrant is achieved (e.g., the levels recorded are equal, within a threshold tolerance). For example, it may be the case that once the fourth step 836 is completed, the incident FSO beam will be sufficiently centered such that no subsequent steps are needed.

Once the initially located apparatus 100 has located the centroid of the incoming FSO signal, it is considered to be finely aligned. As above, the ordered step-search process described above is then repeated by the other apparatus 100 in order to locate the centroid of the FSO signal being transmitted by the initially locating apparatus. In embodiments where dithering is used, the dithering is turned off once the apparatuses 100 are finely-aligned.

In one embodiment, once the centroid of the incoming FSO beam has been located 440, the FSM control 320 communicates with the gimbal assembly 206 to more precisely orient the movable platform 209 and maximize communication link strength. In one embodiment, this is accomplished by centering the FSM 321 and the gimbal assembly 206 at the centers of their respective ranges to provide some expanded range for future tracking.

Once the pair of apparatuses 100 are finely aligned, the apparatuses continue to monitor 450 the incoming FSO signal to identify and correct alignment errors, thereby tracking the incoming FSO signal. For example, if the incoming FSO signal received by the local apparatus 100a drifts slightly to the right, the right hand side of the quad-cell 317 will begin to measure a higher signal intensity than the left. In response, the FSM control 320 of the local apparatus 100a adjusts the orientation of the FSM 321 to re-center the incoming signal on the quad-cell 317. In one embodiment, the FSM control 320 periodically communicates with the gimbal assembly 206 to adjust the movable platform 209 to account for these adjustments to the orientation of the FSM 321. This ensures that the FSM 321 continues to operate within its stroke limit.

Figure 9:
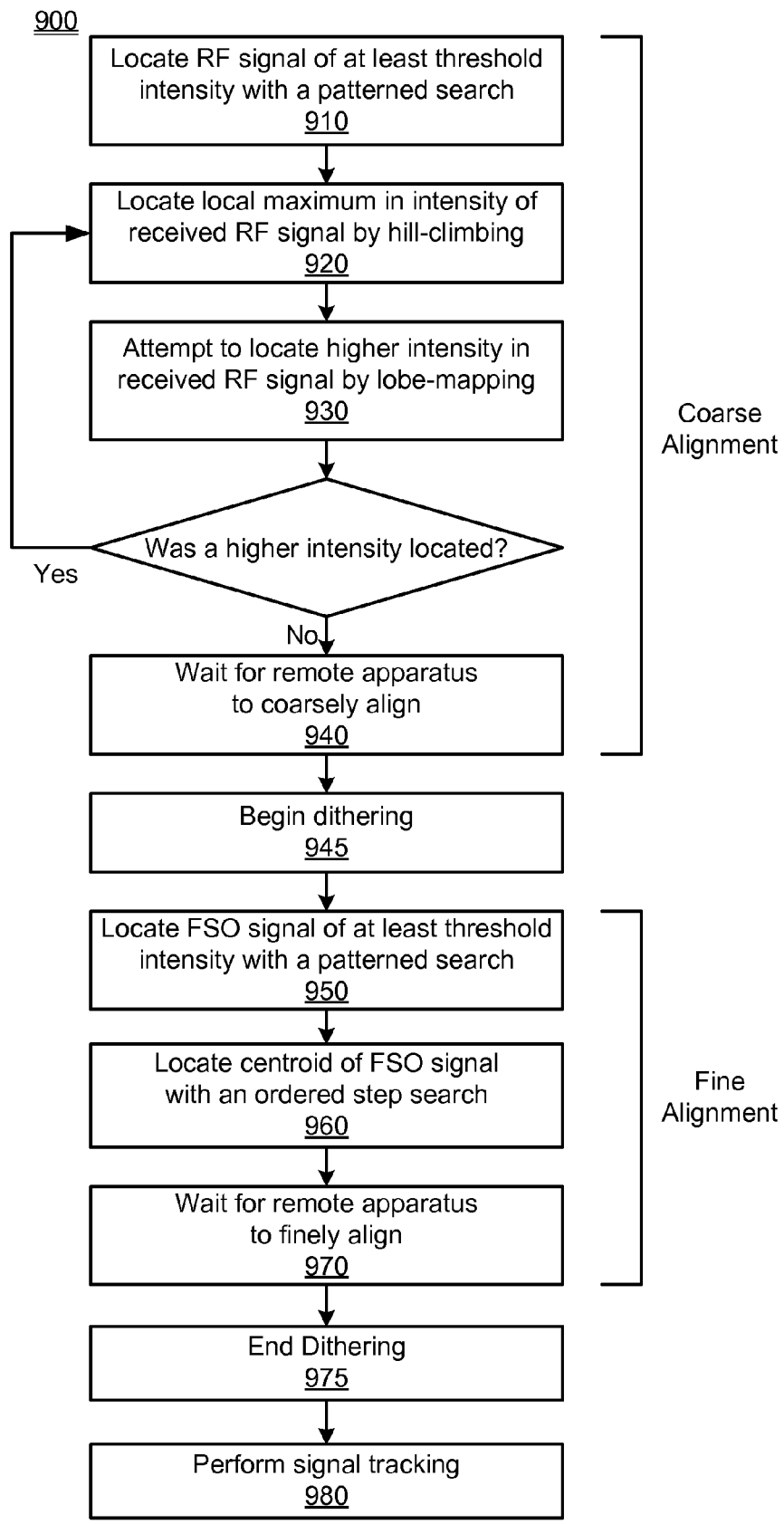
FIG. 9 is a flow chart illustrating the an auto-alignment method in more detail, according to one embodiment.

FIG. 9 illustrates an exemplary method 900 of auto-alignment for a local integrated communications apparatus 100a and a corresponding remote integrated communications apparatus 100b, according to one embodiment. The method 900 begins by locating 910 an RF signal that exceeds a threshold value (e.g., greater than −100 dBm). As described previously, if the threshold is set at an appropriate value, the probability that the received RF signal is from a source other than the remote apparatus 100b is minimal. The RF signal is located 910 using a patterned search pattern implemented by both the local apparatus 100a and the remote apparatus 100b, such as the pattern described above with reference to FIG. 5.

Once an RF signal has been located 910, the local apparatus 100a uses a hill-climbing operation (as described previously with reference to FIG. 6B) to locate 920 the local maximum in the received RF signal. While hill climbing is being performed by the local apparatus 100a, the remote apparatus 100b generally remains substantially stationary, although in other embodiments the remote apparatus may also move (e.g., dithering). The method 900 continues by performing a lobe-mapping operation (as described previously with reference to FIG. 6C) to attempt to locate 930 an orientation of the local apparatus 100a that yields a higher intensity of the received RF signal than the previously located 920 local maximum.

If a higher intensity is successfully located 930, a further hill-climbing operation is performed to locate 920 the new local maximum in intensity of the received RF signal. This is followed by a further lobe-mapping operation to determine if the located 920 local maximum is also the global maximum. This procedure is repeated until a lobe-mapping operation fails to locate 930 an orientation of the local apparatus 100a that yields a higher intensity in the received RF signal. Note that in other embodiments, other break out conditions for the hill-climbing/lobe-mapping loop can be used, e.g., a fixed number of iterations. Once the local apparatus 100a has located the global maximum intensity of the received RF signal, the local apparatus waits 940 for the remote apparatus 100b to complete coarse alignment.

Once both apparatuses 100 are coarsely aligned, dithering of the apparatuses 100 begins 945 (as described previously, with reference to FIG. 4) and the method 900 continues by locating 950 a FSO signal that exceeds a threshold value (e.g., greater than −40 dBm). A patterned search, such as that described previously with reference to FIGS. 7A and 7B is used to locate 950 the FSO signal. Once the FSO signal has been located 950 for at least one of the apparatuses, that apparatus stops the patterned search and the centroid of the FSO signal is located 960, thereby completing fine alignment of the local apparatus 100a. The centroid is located 960 using an ordered step search, such as the one described previously with reference to FIGS. 8A and 8B. Once the local apparatus 100a has located the centroid of the received FSO signal, the local apparatus waits 970 for the remote apparatus 100b to complete fine alignment.

Once both apparatuses 100 have completed fine alignment, dithering of the apparatuses ends 985 and both apparatuses begin to perform 980 signal tracking. As described above, with reference to FIG. 7B, the apparatuses 100 monitor the output of their respective quad-cells 317 to identify and correct for drift in the incoming FSO signal.

Manual Orientation Adjustment

In one embodiment, the integrated communications apparatus 100 includes an external communications port that may be coupled to a mobile device used by a human operator. This allows an apparatus in the field to be serviced by a human operator. Specifically, connection with a mobile device allows the human operator to monitor the apparatus in real time, and provide manual calibrations to the apparatus.

In one implementation, the apparatus is configured to provide a readout of the results of the auto alignment process to the mobile device. The readout includes information regarding the orientation of the gimbal assembly 206 and the FSM 321. If the local apparatus 100a is aligned and communicating with a remote apparatus 100b, indicating that the auto alignment procedure was successful, the readout allows the human operator to provide additional manual adjustment to the orientation of the local apparatus. This is useful if auto alignment, although successful, resulted in the gimbal assembly 206 and/or the FSM 321 being oriented away from the center of their respective range of possible orientations. The human operator may use the readout of orientations to physically reposition the local apparatus 100a. This may entail, for example, rotating the local apparatus 100a with respect to a fixed support structure, or adjusting the bolts (or other physical mechanism) affixing the apparatus to the support structure. The local apparatus 100a, through the mobile device, may also provide the human operator with the option of restarting the auto-alignment process after a manual adjustment of the apparatus. Alternatively, the local apparatus 100a may automatically respond to any human initiated adjustments.

Additional Considerations

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus disclosed herein without departing from the spirit and scope of the invention as defined in the appended claims. Therefore, the scope of the invention should be determined by the appended claims and their legal equivalents.

What is claimed is:

1. A method for aligning a local apparatus with a remote apparatus comprising:
adjusting an orientation of the local apparatus according to a first search pattern;
detecting a radio frequency (RF) signal from the remote apparatus;
adjusting the orientation of the local apparatus based on a spatial gradient of the detected RF signal;
determining an orientation of the local apparatus that corresponds to a local maximum in an intensity of the detected RF signal;
adjusting the orientation of the local apparatus according to a second search pattern;
determining an orientation of the local apparatus that corresponds to a global maximum in the intensity of the detected RF signal;
adjusting a field-of-view of a free space optical (FSO) transceiver of the local apparatus according to a third search pattern;
detecting a FSO signal from the remote apparatus; and
performing an iterative step search to align the FSO transceiver with the detected FSO signal.

2. The method of claim 1, wherein the second adjusting step comprises:
adjusting the orientation of the local apparatus based on variation in the intensity of the detected RF signal, the adjustment locating a local maximum in the intensity of the detected RF signal.

3. The method of claim 2, wherein the second adjusting step further comprises:
adjusting the orientation of the local apparatus in a diverging search pattern until the intensity of the detected RF signal exceeds the intensity at the local maximum.

4. The method of claim 1, wherein adjusting the field-of-view of the FSO transceiver comprises:
adjusting an orientation of a fast steering mirror, the fast steering mirror optically coupled to the FSO transceiver.

5. The method of claim 4, further comprising:
adjusting, once the FSO transceiver is aligned with the detected FSO signal, the orientation of the local apparatus based on the orientation of the fast steering mirror.

6. The method of claim 1, wherein the first search pattern comprises:
adjusting the orientation of the local apparatus in a converging spiral pattern.

7. The method of claim 1, wherein detecting the RF signal from the remote apparatus comprises:
determining that the RF signal has been detected responsive to a received RF intensity of the RF transceiver being greater than a RF threshold.

8. The method of claim 1, wherein the second search pattern begins from the orientation of the local apparatus that corresponds to the local maximum.

9. The method of claim 1, wherein the second search pattern comprises:
adjusting the orientation of the local apparatus in a diverging spiral pattern.

10. The method of claim 1, wherein the second search pattern comprises:
adjusting the orientation of the local apparatus until the intensity of the detected RF signal at a current orientation exceeds the intensity of the detected RF signal at the local maximum; and
adjusting the orientation of the local apparatus based on a spatial gradient of the detected RF signal at the current orientation.

11. The method of claim 1, further comprising:
dithering the orientation of the local apparatus at a local dithering frequency.

12. The method of claim 11, further comprising:
determining that the local apparatus is responsible for an observed drop in intensity of the detected RF signal based on the observed drop in intensity fluctuating at substantially the local dithering frequency.

13. The method of claim 1, further comprising:
determining that a centroid of the FSO signal is substantially aligned with a quad-cell of the FSO transceiver based on one or more centroid-alignment conditions.

14. The method of claim 1, wherein the third search pattern comprises:
adjusting the field-of-view of the FSO transceiver in a converging spiral pattern.

15. The method of claim 1, wherein the iterative step-search comprises one or more steps, each step comprising:
monitoring a measured level of incident optical radiation for each quadrant of a quad-cell, thereby identifying a quadrant upon which the FSO signal is primarily incident; and
adjusting an effective orientation of the FSO transceiver, based on the identified quadrant.

16. The method of claim 1, wherein a first step of the iterative step search adjusts the field-of-view by a first angle and each subsequent step adjusts the field-of-view by a smaller angle than a preceding step.

17. The method of claim 13, wherein the centroid-alignment conditions comprise the measured level of optical radiation for each quadrant of the quad-cell being equal, within a tolerance threshold.

18. The method of claim 13, wherein the centroid-alignment conditions comprise the measured level of optical radiation for each quadrant of the quad-cell exceeding a centroid-alignment threshold level.

19. A non-transitory computer-readable medium storing executable computer-program code, the executable computer-program code comprising instructions for:
adjusting an orientation of the local apparatus according to a first search pattern;
detecting a radio frequency (RF) signal from the remote apparatus;
adjusting the orientation of the local apparatus based on a spatial gradient of the detected RF signal;
determining an orientation of the local apparatus that corresponds to a local maximum in an intensity of the detected RF signal;
adjusting the orientation of the local apparatus according to a second search pattern;
determining an orientation of the local apparatus that corresponds to a global maximum in the intensity of the detected RF signal;
adjusting a field-of-view of a free space optical (FSO) transceiver of the local apparatus according to a third search pattern;
detecting a FSO signal from the remote apparatus; and
performing an iterative step search to align the FSO transceiver with the detected FSO signal.

20. The non-transitory computer-readable medium of claim 19, wherein the second adjusting step comprises:
adjusting the orientation of the local apparatus based on variation in the intensity of the detected RF signal, the adjustment locating a local maximum in the intensity of the detected RF signal; and adjusting the orientation of the local apparatus in a diverging search pattern until the intensity of the detected RF signal exceeds the intensity at the local maximum.

21. The non-transitory computer-readable medium of claim 19, wherein the first search pattern comprises:
   adjusting the orientation of the local apparatus in a converging spiral pattern.

22. The non-transitory computer-readable medium of claim 19, wherein the second search pattern begins from the orientation of the local apparatus that corresponds to the local maximum.

23. The non-transitory computer-readable medium of claim 19, wherein the second search pattern comprises:
   adjusting the orientation of the local apparatus in a diverging spiral pattern.

24. The non-transitory computer-readable medium of claim 19, wherein the second search pattern comprises:
   adjusting the orientation of the local apparatus until the intensity of the detected RF signal at a current orientation exceeds the intensity of the detected RF signal at the local maximum; and
   adjusting the orientation of the local apparatus based on a spatial gradient of the detected RF signal at the current orientation.

25. The non-transitory computer-readable medium of claim 19, wherein the executable computer-program code further comprises instructions for:
   dithering the orientation of the local apparatus at a local dithering frequency; and
   determining that the local apparatus is responsible for an observed drop in intensity of the detected RF signal based on the observed drop in intensity fluctuating at substantially the local dithering frequency.

26. The non-transitory computer-readable medium of claim 19, wherein the executable computer-program code further comprises instructions for:
   determining that a centroid of the FSO signal is substantially aligned with a quad-cell of the FSO transceiver based on one or more centroid-alignment conditions.

27. The non-transitory computer-readable medium of claim 19, wherein the third search pattern comprises:
   adjusting the field-of-view of the FSO transceiver in a converging spiral pattern.

28. The non-transitory computer-readable medium of claim 19, wherein the iterative step-search comprises one or more steps, each step comprising:
   monitoring a measured level of incident optical radiation for each quadrant of a quad-cell, thereby identifying a quadrant upon which the FSO signal is primarily incident; and
   adjusting an effective orientation of the FSO transceiver, based on the identified quadrant.

29. The non-transitory computer-readable medium of claim 19, wherein a first step of the iterative step search adjusts the field-of-view by a first angle and each subsequent step adjusts the field-of-view by a smaller angle than a preceding step.

* * * * *